United States Patent [19]

Marvy et al.

[11] Patent Number: 5,031,683
[45] Date of Patent: Jul. 16, 1991

[54] STAND FOR PANELS

[76] Inventors: James Marvy, 5810 Salisbury Ave., Minnetonka, Minn. 55345; Robert W. Heili, 434 Newton Ave. South, Minneapolis, Minn. 55405

[21] Appl. No.: 516,317

[22] Filed: Apr. 30, 1990

Related U.S. Application Data

[62] Division of Ser. No. 295,026, Jan. 9, 1989.

[51] Int. Cl.⁵ .............................................. A47G 5/00
[52] U.S. Cl. .................................... 160/351; 248/167
[58] Field of Search ............... 160/135, 351, 352, 350; 248/473, 167; 40/606, 610, 152.1; 52/239, 71

[56] References Cited

U.S. PATENT DOCUMENTS

| | | | |
|---|---|---|---|
| 283,885 | 8/1883 | Hatcher | 248/167 |
| 604,215 | 5/1898 | Quarry | 160/351 |
| 1,386,469 | 8/1921 | Gomoll | 248/473 |
| 1,864,077 | 6/1932 | Lewis et al. | 160/351 X |
| 2,345,913 | 4/1944 | Bishop | 160/351 X |
| 2,710,474 | 6/1955 | Hynek | 40/610 |
| 3,592,288 | 7/1971 | Walter | 160/351 X |
| 3,940,100 | 2/1976 | Haug . | |
| 4,200,254 | 4/1980 | Nelson | 160/351 X |
| 4,368,586 | 1/1983 | Forzelias | 40/606 X |
| 4,574,917 | 3/1986 | Stoddard . | |

Primary Examiner—David M. Purol
Attorney, Agent, or Firm—Palmatier & Sjoquist

[57] ABSTRACT

The present foam board stand includes a flat, generally triangular piece or body with a central slot for receiving a foam board. A pair of integral rigid legs extend from either end of the piece and a swingable leg is disposed between the rigid legs. The swingable leg is pivotal into and out of the plane of the flat piece so that the stand may be oriented in a planar compact form or an operating free-standing form.

10 Claims, 3 Drawing Sheets

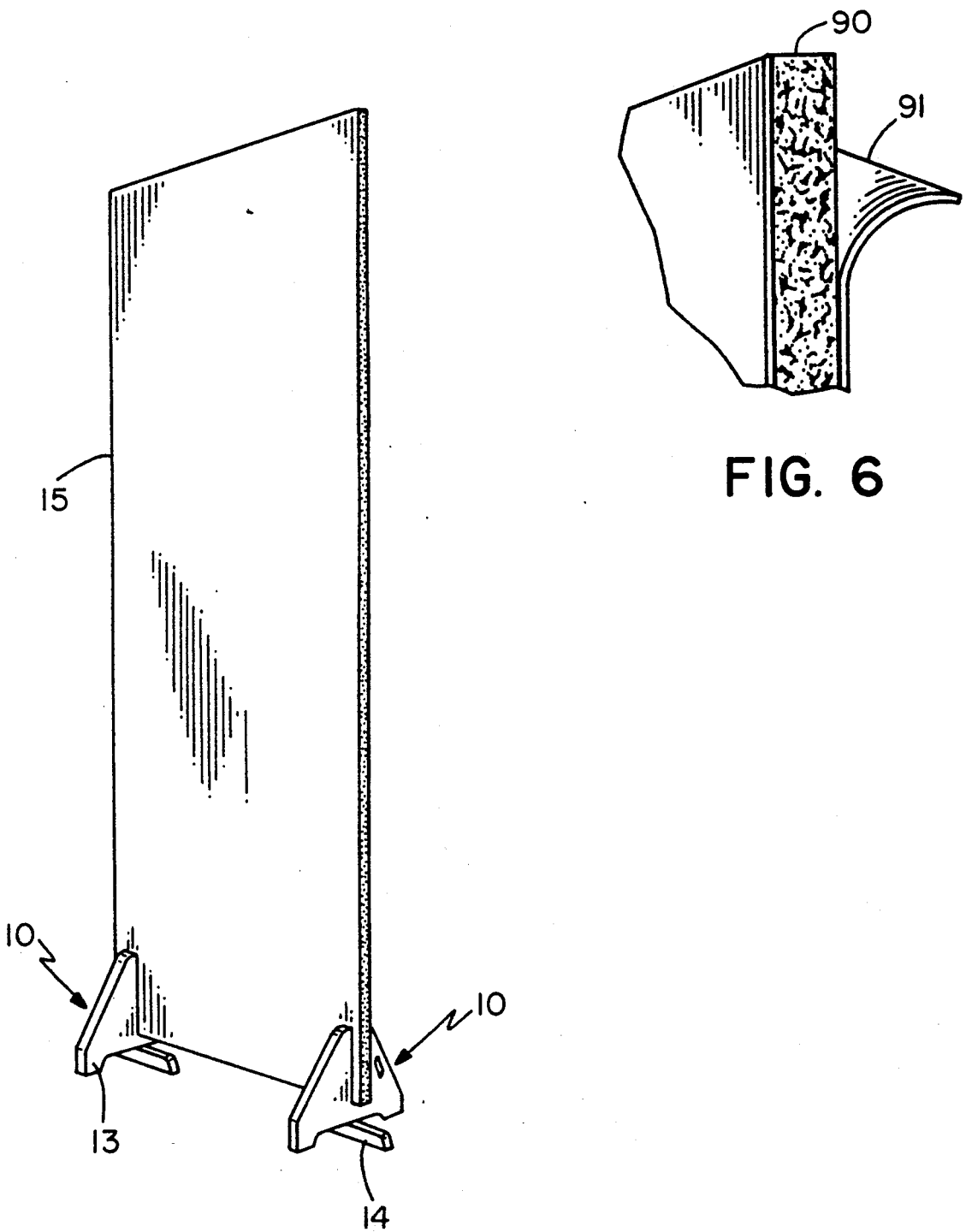

STAND FOR PANELS

This application is a division of U.S. application Ser. No. 295,026, Jan. 9, 1989.

The present invention relates to stands and, more particularly, to stands with swingable legs for panels.

BACKGROUND OF THE INVENTION

Relatively large panels are used extensively in the graphics industry for wall or portable displays. Large panels also serve as partitions for partitioning off work spaces such as in the photographic industry, in the performing arts, or in the conventional office where partitions are now commonplace for creating temporary and even permanent working quarters.

Such partitions or panels are typically mounted in an upright position by a number of methods. One method is to join two or more panels in a V or zigzag arrangement so that the panels support each other. With this method, two way corners or hinges often connect or join the adjacent panels. Where a single panel is to be free standing, a pair of rod-like clips or feet, each formed in the shape of an inverted T, may be clipped to the bottom edge of a panel. Furthermore, such as in the photographic industry, panels may be disposed upright by clamping an edge of the panel to a relatively unstable tripod-like light stand. It is also common to simply tape the panels to wooden boxes.

One type of panel is foam board which is typically a relatively large rectangular board with a rigid polystyrene foam core laminated on both sides with a heavy paper liner. The rigid polystyrene foam interior is lightweight and provides dimensional stability.

SUMMARY OF THE INVENTION

A feature of the present invention is the provision in a panel stand having a slot for seating the panel and a set of at least three legs supporting the stand relative a surface, of a swingable leg being swingable into and out of alignment with at least one of the other legs such that the legs form a compact linear orientation for storage and an operating non-linear orientation in which the stand is free standing for disposing the panel in an upright position.

Another feature is the provision in such a panel stand, of the swingable leg being disposed between two rigid legs wherein the length of the swingable leg is substantially equal to the distance between the rigid legs, and wherein the swingable leg is swingable for 360°.

Another feature is the provision in such a panel stand, of the swingable leg including two surface-bearing end portions and a pivot disposed medially between the end portions wherein the pivot is joined to the stand immediately below the seat for the panel.

An advantage of the present invention is that the stand is free standing. The initial set up operations of panel graphic displays such as at trade shows and the manipulation of board partitions in studios, are often one man operations. Since the board utilized for such purposes is typically a relatively large panel, an extraordinary amount of dexterity is often required to join the board to other board panels or mount the board on a prior art foot or clamp. With the present invention, the swingable leg may be pivoted to provide a third leg and render the stand free-standing. The open stand thus may be placed upright on a surface to allow an operator to use both hands to grab the large panel and manipulate it into the slot.

Another advantage is that the stand may assume a compact planar flat form for storage.

Another advantage is that the stand includes only one moving part.

Another advantage is that the stand is relatively sturdy with a pivot of the swingable leg being disposed immediately below the seat for the board.

Other advantages are that the stand is inexpensively and easily fabricated and simple to operate.

BRIEF DESCRIPTION OF THE DRAWINGS

FIG. 5 is a perspective view of a foam board mounted on two of the stands of FIG. 2.

FIG. 6 is a detail partial view of the foam board of FIG. 5.

DETAILED DESCRIPTION OF THE PREFERRED EMBODIMENTS

Figure 1:
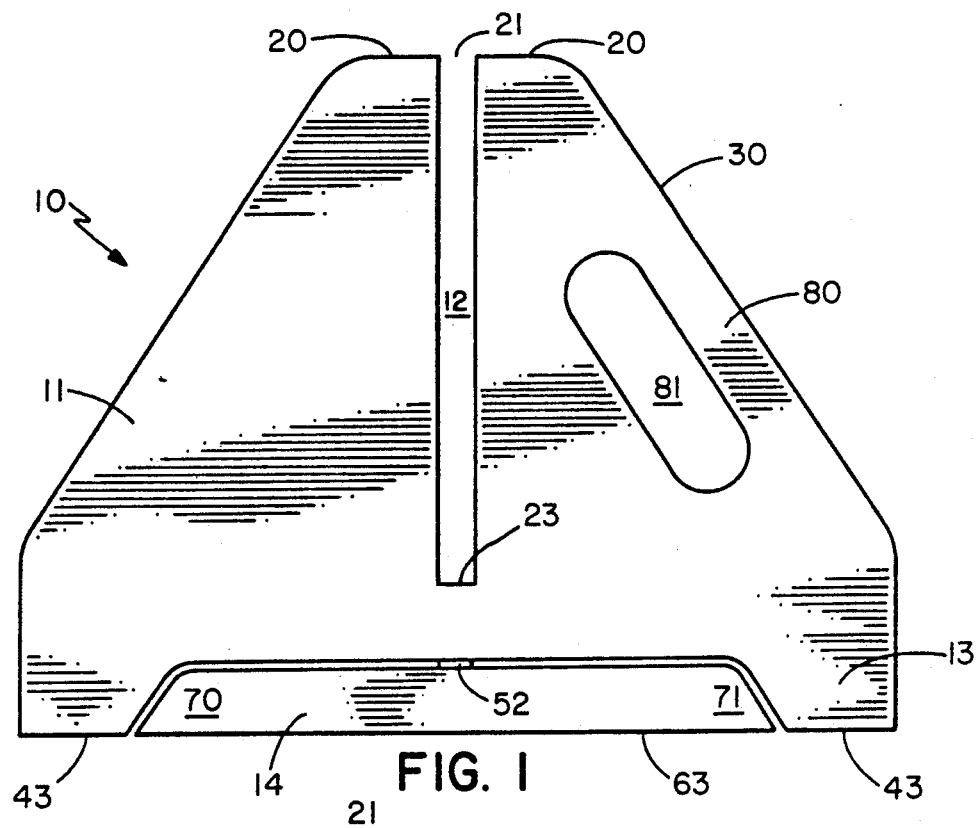
FIG. 1 is a side elevation view of the stand with a swingable aligned with the other legs.

The present stand for panels is indicated in general by the reference numeral 10 and includes a generally triangular flat piece or stand body 11, a slot 12, a pair of rigid legs 13, and a swingable leg 14. Typically a pair of stands 10 mount a foam board 15.

An upper portion of the flat piece or stand body 11 includes a pair of upper planar edges 20 which form an upper opening 21 for the slot 12. Each of the edges 20 intersect with upright planar elongate edges 22 which form the main portion of the slot 12. The upright edges 22 intersect with a lower planar edge or seat 23. The opening 21 and slot 12 receive a lower portion of the board 15, which is seated on the seat 23. The distance between the edges 22 is typically approximately equal to the thickness of the board 15 so that the board 15 is held with some friction in the slot 12.

The flat piece 11 further includes a pair of angled edges 30 which extend downwardly and away from their respective intersecting edges 20. The edges 30 are angled so that the stand 10 occupies as little space as possible to, for example, minimize the chances of tripping over the stand 10. Each of the edges 30 lead into a respective upright edge 31. It should be noted that the intersecting edge portions 32 disposed between edges 30 and edges 20 are rounded, and that the intersecting edge portions 33 disposed between edges 30 and 31 are rounded.

A lower portion of the flat piece 11 includes a lower planar edge 40 which leads into a pair of beveled lower edges 41. Intersecting edge portions 42 between edge 40 and edges 41 are rounded. Edges 31 and 41 intersect with leg planar edges 43 which bear against a surface on which the stand 10 rests. Planar edges 43 lie in a common plane. Edges 31, 41, 43 form respective rigid legs 13. The flat piece 11 further includes opposing faces 45.

The swingable leg or base portion or cross brace 14 is pivotally joined to the flat piece 11 immediately below the seat 23 via a pin connector or pivot 50. The pin connector 50 includes a head 51, a washer 52 disposed between the flat piece 11 and the swingable leg 14, and a lock nut 53 disposed in a recess 54 formed in the swingable leg 14.

The swingable leg 14 includes an upper planar edge 60 leading to rounded intersecting portions 61, which lead into beveled edges 62. One of the reasons that edges 62 are beveled is so the leg 41 occupies a minimum amount of space to, for example, minimize tripping over the leg 41. Edges 60, 61, 62 run adjacent and parallel to edges 40, 41, 42. The swingable leg 14 further includes a lower planar edge 63 which lies in a common plane with edges 43 of the rigid legs 13. The length of the swingable leg 14 is approximately equal to the distance between edges 41.

Figure 2:
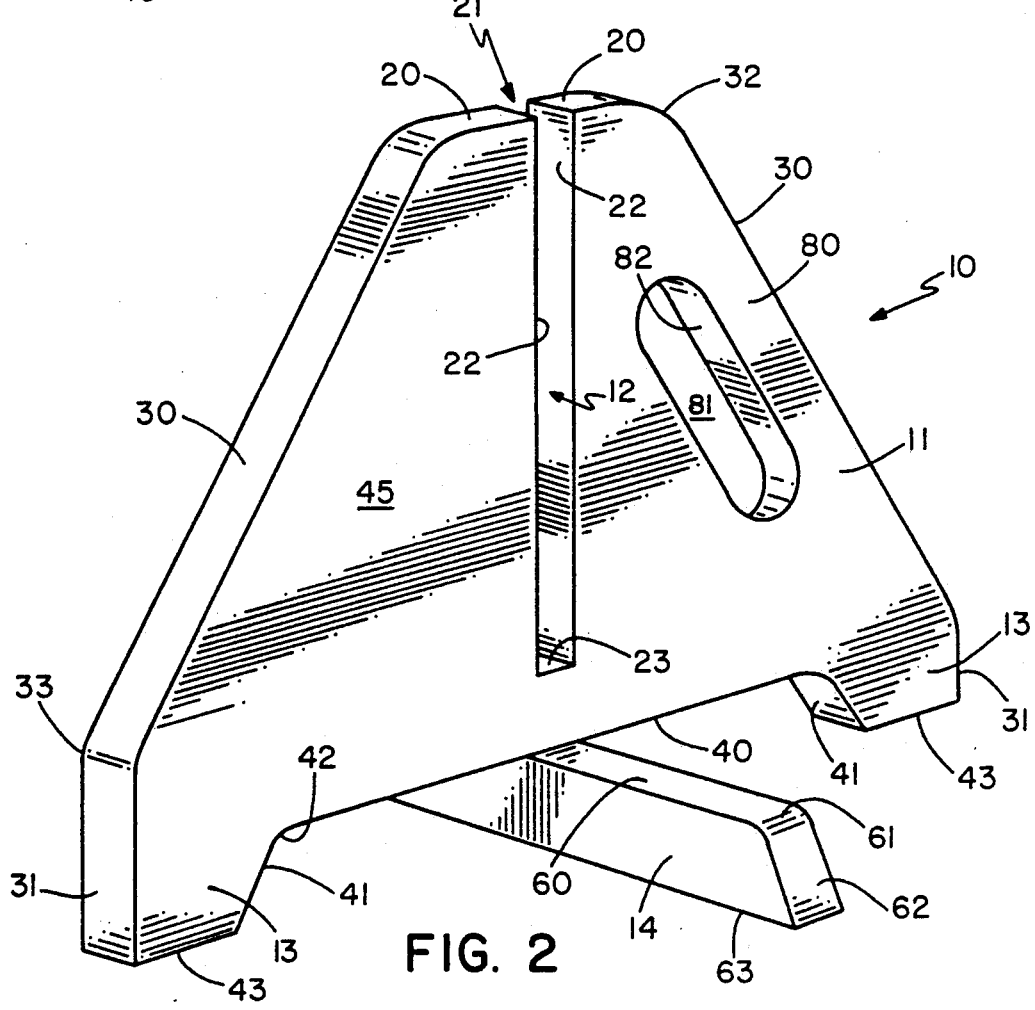
FIG. 2 is a perspective view of the stand in FIG. 1 with the swingable leg swung to an operating perpendicular position.
Figure 3:
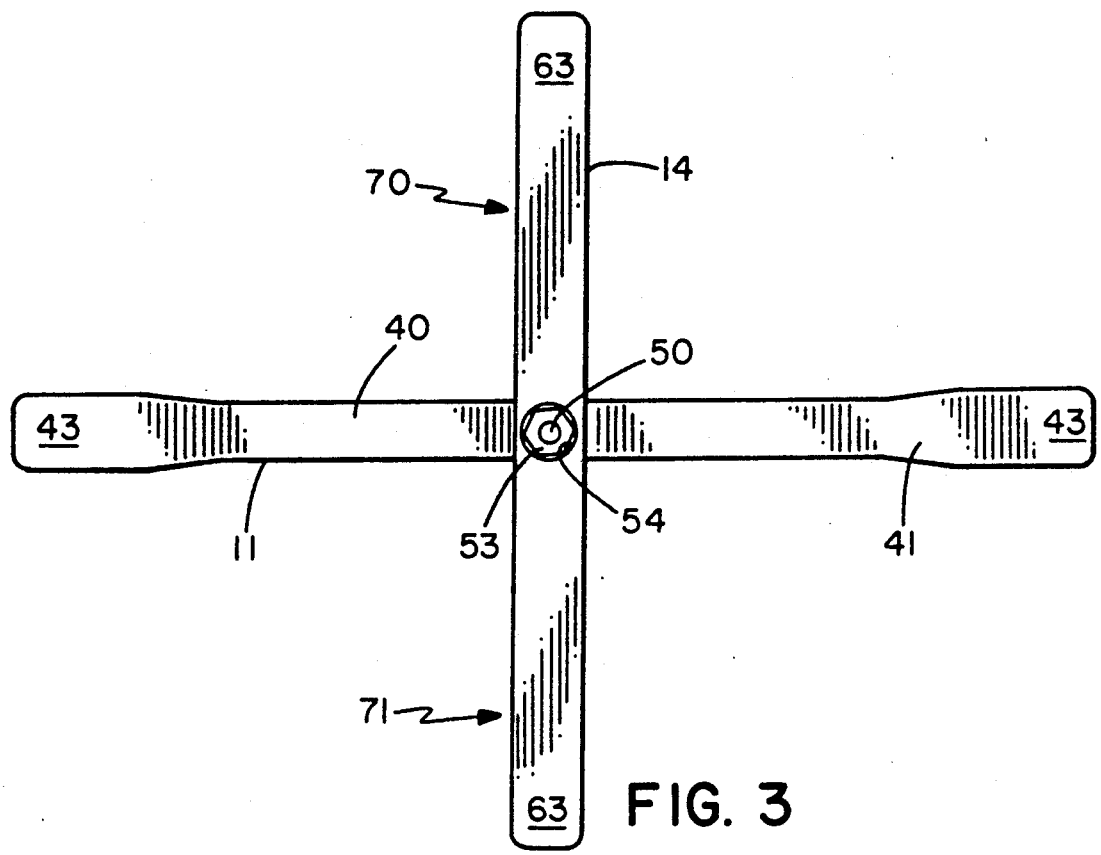
FIG. 3 is a bottom plan view of the stand of FIG. 2.
Figure 4:
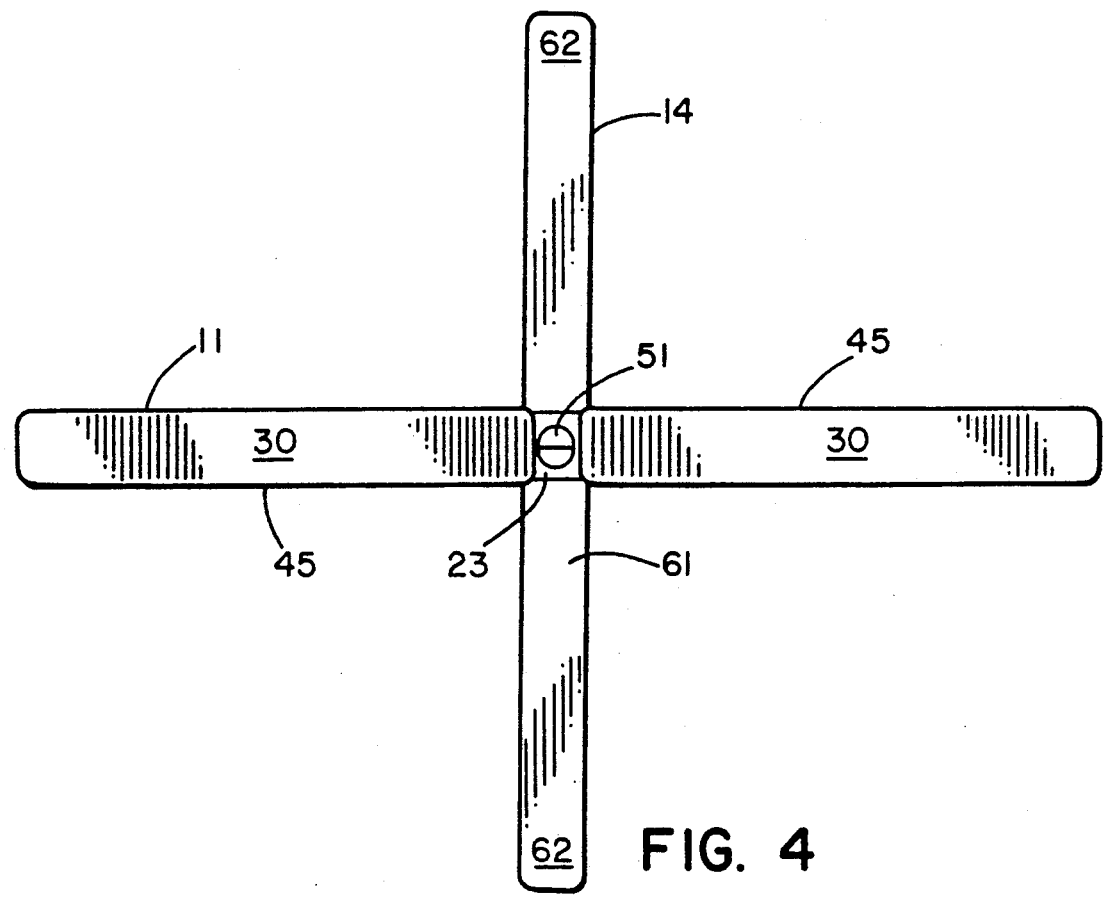
FIG. 4 is a top plan view of the stand of FIG. 2.

The pin connector 50 is disposed centrally in the swingable leg 14 so as to define a pair of half portions or elongate leg portions 70, 71, each of which is a mirror image of the other so that the swingable leg is pivotal for 360°. As shown in FIG. 2, when the swingable leg 14 is pivoted perpendicularly to flat piece 11, the stand 10 is free standing. Moreover, as shown in FIG. 1, it should be noted that, even when the swingable leg 14 is parallel with flat piece 11 so as to be aligned therewith, the stand 10 is free standing as planar edges 43 and 63 lie in a common plane and are formed at generally right angles to faces 45.

The flat piece 11 further includes a handle 80 and a hand sized elongate aperture 81. An aperture-forming interior edge 82 lies parallel to its adjacent angled edge 30 to form the handle 80. The aperture 81 also allows the stand 10 to be hung or stored on a peg.

The board 15 typically comprises a polystyrene foam core 90 which is laminated on both sides with a heavy paper liner 91. The preferred brand of foam board is FOME-COR® board available from Monsanto. A typical foam board may measure 8'×4'×⅛. The board 15 may be a plywood panel wherein the thickness of the plywood panel is less than the width of the slot 12.

In operation, to dispose a foam board 15 in an upright position, the stand 10 is opened from a compact form with swingable leg 14 being parallel to and aligned with flat piece 11 to a free standing form with leg 14 perpendicular to flat piece 11 by pivoting the swingable leg 14 to its perpendicular position. Typically, two stands 10 are opened before manipulating a foam board 15; however, it should be noted that one stand 10 may sufficiently dispose an 8'×4' panel of foam board 15 in an upright position.

After the stands 10 have been opened, the foam board is lifted and set into the slots 12 and onto the seats 23. Subsequently, since the foam board is frictionally held in the slots 12, the foam board 15 and stands 10 may be slid or lifted together to a desired floor or display position.

To remove the foam board 15 from the stand 10, a foot may be brought to bear on the perpendicularly disposed leg 14, and the foam board 15 may be lifted from the held stand 10. Since one stand 10 is typically sufficient to hold the foam board upright, the foam board 15 is precluded from tipping or falling until the other stand 10 is removed from the other side of the foam board 15.

It should be further noted that the stand 10 is typically formed of wood so that it may be readily painted or black or any other color for photographic purposes, and that the stand 10 is free standing when the swingable leg 14 is disposed at any angle relative the flat piece 11.

In the photographic industry, the panel or board 15 is typically white on one side and black on the other side. When the black side is required such as to absorb outside light, it is a simple matter to manipulate the board 15 when the board 15 is in the stand 10. Conversely, when fill or bounce lighting is desired, the board 15 is easily turned around by sliding the stands 10 on the floor to orient the white side toward the subject being photographed.

The present invention may be embodied in other specific forms without departing from the spirit or essential attributes thereof; therefore, the illustrated embodiment should be considered in all respects as illustrative and not restrictive, reference being made to the appended claims rather than to the foregoing description to indicate the scope of the invention.

What is claimed:

1. A stand for disposing boards and the like in an upright position comprising:
   a flat rigid body of generally uniform thickness to be disposed substantially in one plane, the body including a pair of upper edges, a pair of lower edges, and a pair of oblique edges extending from the upper edges, the lower edges being flat for supporting the body relative to a surface,
   a recess formed between the lower flat edges and defined by a recessed edge,
   an elongate linear slot formed between the upper edges and centrally in the body, the slot forming a seat for seating the board, the slot being disposed perpendicular to the lower flat edge, the depth of the slot being greater than one-half the height of the body,
   a pair of spaced apart rigid integral legs formed integrally with the body and defined in part by portions of the recessed edge and lower flat edges, the legs and body being disposed substantially in a common plane,
   an elongate swingable leg pivotally connected to the body in the recess below the slot, the swingable leg having top and bottom edges, the top edge running adjacent and parallel to the recessed edge, the bottom edge being flat for bearing upon and supporting the body relative to the surface and disposed in line with the lower flat edges of the body, the length of the swingable leg being greater than one-half the width of the body as defined by the integral legs, the length of the swingable leg being approximately equal to the distance between the integral legs, the thickness of the swingable leg being substantially the same as the thickness of the body, the swingable leg being pivotal relative to the body to be disposable in the common plane, the swingable leg being symmetrical to be pivotable for 360° in the recess, and
   a pivot connection for pivotally connecting the swingable leg to the body, the pivot connection being axially aligned with the slot whereby the swingable leg is pivotable to lie perpendicular to the body to support the body relative to the surface and dispose the board in the upright position.

2. The stand according to claim 1, wherein the swingable leg includes a beveled edge extending from the top edge to the bottom edge, the bottom edge being greater in length than the top edge.

3. The stand according to claim 1, wherein the oblique edges extend downwardly and away from each other and lead into vertically extending edges, the seat being disposed at a level below the oblique edges.

4. The stand according to claim 1, wherein the body includes an elongate aperture formed in part by an interior edge running parallel to one of the oblique edges, the length of the elongate aperture being approximately the width of a hand to form an integral handle for manipulating the stand.

5. A foam board stand in combination with a foam board for disposing foam boards in an upright position comprising:
    a foam board;
    a flat rigid body of generally uniform thickness to be disposed substantially in one plane, the body including a pair of upper edges, a pair of lower edges, and a pair of oblique edges extending from the upper edges, the lower edges being flat for supporting the body relative to a surface,
    a recess formed between the lower flat edges and defined by a recessed edge,
    an elongate linear slot formed between the upper edges and centrally in the body, the slot forming a seat for seating the board, the slot being disposed perpendicular to the lower flat edge, the depth of the slot being greater than one-half the height of the body,
    a pair of spaced apart rigid integral legs formed integrally with the body and defined in part by portions of the recessed edge and lower flat edges, the legs and body being disposed substantially in a common plane,
    an elongate swingable leg pivotally connected to the body in the recess below the slot, the swingable leg having top and bottom edges, the top edge running adjacent and parallel to the recessed edge, the bottom edge being flat for bearing upon and supporting the body relative to the surface and disposed in line with the lower flat edges of the body, the length of the swingable leg being greater than one-half the width of the body as defined by the integral legs, the length of the swingable leg being approximately equal to the distance between the integral legs, the thickness of the swingable leg being substantially the same as the thickness of the body, the swingable leg being pivotal relative to the body to be disposable in the common plane, the swingable leg being symmetrical to be pivotable for 360° in the recess, and
    a pivot connection for pivotally connecting the swingable leg to the body, the pivot connection being axially aligned with the slot whereby the swingable leg is pivotable to lie perpendicular to the body to support the body relative to the surface and dispose the board in the upright position.

6. The stand according to claim 5, wherein the swingable leg includes a beveled edge extending from the top edge to the bottom edge, the bottom edge being greater in length than the top edge.

7. The stand according to claim 5, wherein the oblique edges extend downwardly and away from each other and lead into vertically extending edges, the seat being disposed at a level below the oblique edges.

8. The stand according to claim 5, wherein the body includes an elongate aperture formed in part by an interior edge running parallel to one of the oblique edges, the length of the elongate aperture being approximately the width of a hand for manipulating the stand.

9. The foam board stand according to claim 5, wherein the foam board includes a polystyrene foam core with two faces, each of the faces laminated with a heavy paper liner.

10. A stand for disposing boards and the like in an upright position comprising:
    a flat rigid body of generally uniform thickness to be disposed substantially in one plane, the body including a pair of upper edges, a pair of lower edges, and a pair of oblique edges extending from the upper edges, the lower edges being flat for supporting the body relative to a surface, the oblique edges extending downwardly and away from each other and leading into vertically extending edges,
    the body including an elongate aperture formed in part by an interior edge running parallel to one of the oblique edges, the length of the elongate aperture being approximately the width of a hand to form an integral handle for manipulating the stand,
    a recess formed between the lower flat edges and defined by a recessed edge,
    an elongate linear slot formed between the upper edges and centrally in the body, the slot forming a seat for seating the board, the slot being disposed perpendicular to the lower flat edge, the depth of the slot being greater than one-half the height of the body, the seat being disposed at a level below the oblique edges,
    a pair of spaced apart rigid integral legs formed integrally with the body and defined in part by portions of the recessed edge and lower flat edges, the legs and body being disposed substantially in a common plane,
    an elongate swingable leg pivotally connected to the body in the recess below the slot, the swingable leg having top and bottom edges, the top edge running adjacent and parallel to the recessed edge, the bottom edge being flat for bearing upon and supporting the body relative to the surface and disposed in line with the lower flat edges of the body, the length of the swingable leg being greater than one-half the width of the body as defined by the integral legs, the length of the swingable leg being approximately equal to the distance between the integral legs, the thickness of the swingable leg being substantially the same as the thickness of the body, the swingable leg being pivotal relative to the body to be disposable in the common plane, the swingable leg being symmetrical to be pivotable for 360° in the recess, the swingable leg including a beveled edge extending from the top edge to the bottom edge, the bottom edge being greater in length than the top edge, and
    a pivot connection for pivotally connecting the swingable leg to the body, the pivot connection being axially aligned with the slot whereby the swingable leg is pivotable to lie perpendicular to the body to support the body relative to the surface and dispose the board in the upright position.

* * * * *

UNITED STATES PATENT AND TRADEMARK OFFICE
CERTIFICATE OF CORRECTION

PATENT NO. : 5,031,683
DATED : July 16, 1991
INVENTOR(S) : James Marvy and Robert W. Heili It is certified that error appears in the above-identified patent and that said Letters Patent is hereby corrected as shown below:

Column 2, line 15, after "swingable" and before "aligned insert --leg--.

Column 3, line 35, after "1/2" and before "." insert --"--.

Signed and Sealed this

Fourth Day of May, 1993

Attest:

MICHAEL K. KIRK

*Attesting Officer*     *Acting Commissioner of Patents and Trademarks*